United States Patent [19]
Schofield et al.

[11] Patent Number: 5,473,715
[45] Date of Patent: Dec. 5, 1995

[54] HYBRID FIBER OPTIC/ELECTRICAL CONNECTOR

[75] Inventors: Philip W. Schofield, Oak Park; Charles A. Kozel, McHenry; Daniel P. Vladic, Antioch, all of Ill.

[73] Assignee: Methode Electronics, Inc., Chicago, Ill.

[21] Appl. No.: 237,277

[22] Filed: May 3, 1994

[51] Int. Cl.⁶ .............................. G02B 6/36; G02B 7/26
[52] U.S. Cl. ................................ 385/53; 385/75
[58] Field of Search ......................... 385/59, 71, 75, 385/101, 53

[56] References Cited

U.S. PATENT DOCUMENTS

| | | | |
|---|---|---|---|
| 4,217,030 | 8/1980 | Howarth | 385/75 |
| 4,439,006 | 3/1984 | Stevenson | 385/89 |
| 4,597,631 | 7/1986 | Flores | 385/75 |
| 4,678,270 | 7/1987 | Gunn et al. | 385/101 |
| 4,695,127 | 9/1987 | Ohlhaber et al. | 385/101 |
| 4,732,446 | 3/1988 | Gipson et al. | 385/24 |
| 4,896,939 | 1/1990 | O'Brien | 385/101 |
| 4,991,927 | 2/1991 | Anstey | 385/101 |
| 5,140,659 | 8/1992 | Minds et al. | 385/101 |
| 5,159,651 | 10/1992 | Gavdy | 385/75 |

*Primary Examiner*—Rodney B. Bovernick
*Assistant Examiner*—Robert E. Wise
*Attorney, Agent, or Firm*—David L. Newman

[57] ABSTRACT

A fiber optic and electrical hybrid connector is disclosed for providing remote system connectivity management and verification, comprising a first fiber optic connector including a housing. A first electrical connector mounted to the housing of the first fiber optic connector is provided for data identification transmission. The first fiber optic connector is mated to a second fiber optic connector and the first electrical connector simultaneously mating to a second electrical connector. The first electrical connector includes a transistor having a 64 bit ROM, a 48 bit Serial Number, an 8 bit CRC and an 8 bit family code. The second electrical connector includes data lines connected to a PCB having visual signal illumination connectivity means and remote connectivity management means. The first elecrtrical connector derives power from the data signal lines of the second electrical connector.

18 Claims, 2 Drawing Sheets

HYBRID FIBER OPTIC/ELECTRICAL CONNECTOR

BACKGROUND OF THE INVENTION

This invention relates to a hybrid fiber optic/electrical connector and in particular, a fiber optic connector for facilitating remote system connectivity management and verification.

Fiber optic connectors are commonly used for data transmission for multiple wide area networks. It is common to use a patch panel for supporting multiple fiber optic connector links to a controller system. The multiple fiber optic connectors arranged on the patch panel frequently must be disconnected and connected. As well, new connections are continuously being made increasing the number of fiber optic connectors inserted into the patch panel. As the fiber optic receptacle and plug are inactive, there is no means for determining the connectivity status of the fiber optic connectors or which fiber optic connectors have been activated or deactivated at the patch panel. As well, there is no method of quickly determining from a remote location which fiber optic connectors have been activated or deactivated.

It is therefore an object of the present invention to provide a fiber optic and electrical hybrid connector including a means for verification of the connectivity of a fiber optic connector.

It is a another object of the present invention to provide a remote system management means for determining the connectivity of the fiber optic connectors.

SUMMARY OF THE INVENTION

A fiber optic and electrical connector for facilitating remote system management and verification comprising a housing for a fiber optic connector including an electrical connector providing for data identification transmission. The electrical connector mating to a corresponding electrical connector including an integrated circuit. The power for the electrical connector derived from the data line side only. The electrical connector including a single in-line connector (SIL). The SIL including a small outline transistor (SOT). The SOT includes a 64 bit ROM that includes a 48 bit Serial Number an 8 bit CRC and an 8 bit family code. The SOT is fully reverse compatible.

These and other features of the invention are set forth below in the following detailed description of the presently preferred embodiments.

DETAILED DESCRIPTION OF THE PRESENTLY PREFERRED EMBODIMENTS

Figure 1:
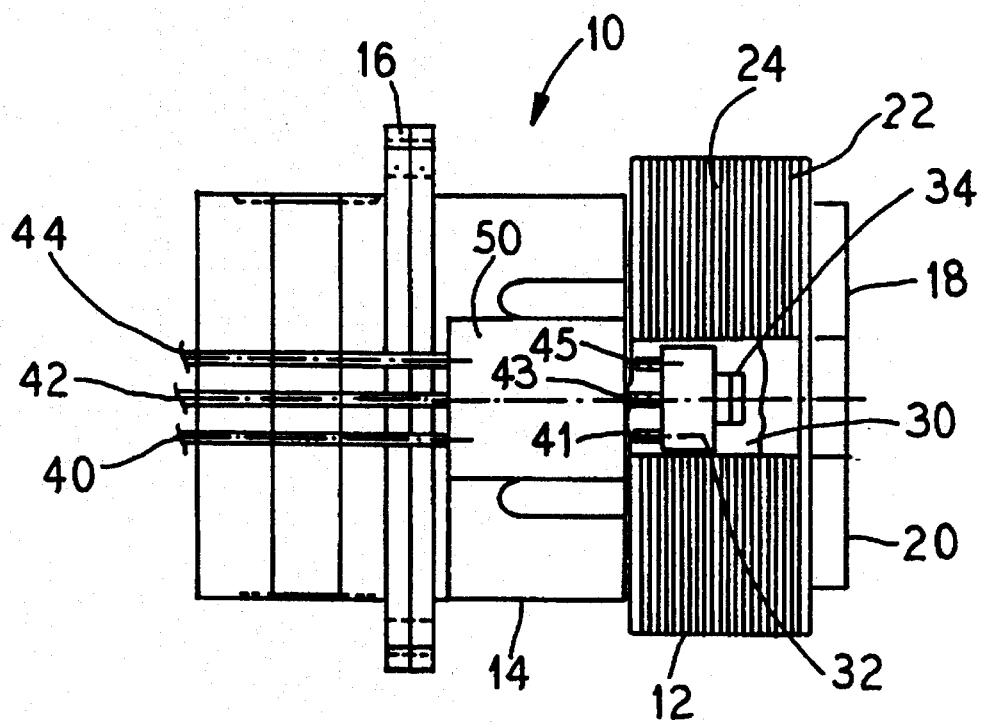
FIG. 1 is a top view of the connected fiber optic and electrical connector.

The present invention relates to a fiber optic and electrical hybrid connector described as referred to in FIGS. 1–4. The fiber optic and electrical connector 10 is shown in FIG. 1. A first fiber optic connector 12 in a preferred embodiment is a plug which is inserted into a second fiber optic connector 14. The second fiber optic connector 14 is mounted to patch panel 16. In a preferred embodiment of the present invention, a pair of simplex SC style fiber optic connectors 18,20 are held within a duplex collar 22. Although the duplex SC connector 12 is shown in the preferred embodiment of this invention, any fiber optic connector with push/pull style mating action may be used including but not limited to an ESCON or an FDDI fiber optic connector.

Attached to the housing 24 of the duplex collar 22 is a first electrical connector 32. In a preferred embodiment, a single in-line connector (SIL) is ultrasonically welded to the housing 24. However, any pin and socket connector or any mounting technique, including one-piece molding may be used. The SIL in this preferred embodiment is a 3 pin electrical connector.

Incorporated within the first electrical connector 32 is small outline transistor (SOT) 34. The transistor 34 provides a unique electronically accessible identifier. In a preferred embodiment a Dallas semiconductor SOT DS2401 is used. The DS2401 enhanced Silicon Serial Number is a low cost electronic serial number that can provide an absolutely unique identity which can be determined with a minimal electronic interface, typically a single port pin of a micro-controller. The SOT 34 consists of a 64 bit ROM that includes a 48 bit Serial Number, an 8 bit CRC and an 8 bit family code. Data is transferred serially via the one-wire protocol which requires only a single data lead 40 and a ground return 42. Power for reading and writing the device is derived from data line 44 itself and no need for an external power source. The SOT is fully reverse compatible but provides additional multi-drop capability that enables many devices to reside on a single data line. The SOT package provides a compact enclosure that allows standard assembly equipment to handle the device easily. The 48 bit Serial Number, 8 bit family code and 8 bit CRC are retrieved using the one-wire protocol. This protocol defines bus transactions in terms of the bus state during specified time slots that are initiated on the falling edge of sync pulses from the bus master. The one-wire bus is a system which has a single bus master system and one or more slaves. In all instances, the SOT is a slave device. The bus master is typically a micro-controller.

The Silicon Serial Number holds a one-of-a-kind number that forms a license plate to provide positive identification. The digital number in the SOT can be read directly by other chips on the board, providing for control board or printed circuit board (PCB) identification. Not only does this help the manufacturing process, but it also provides for long term traceability and verification. The SOT's number may be engraved on the plastic package or lid of the stainless micro-can as a human-readable marking. The Silicon Serial Number serves as a reference number just like a license plate number, phone number, network node address, or serial number.

FIG. 1 shows a cut-away view of the first electrical connector 32. The first electrical connector 32 includes receptacle pins 41,43,45. These pins correspond to data lines 40,42,44, respectively. A second electrical connector 50 is mounted to the receptacle side of the second fiber optic connector 14, and includes male pins which are inserted into the receptacle pins 42,43,45. Thus, upon mating the fiber optic connector plug 12 with the second fiber optic connector 14, the first electrical connector 32 mates simultaneously with the second electrical connector 50. Upon connection, the power signal from line 44 is received by the SOT 34 which returns a signal including a serial number to line 40 and to a PCB attached thereto. In a preferred embodiment, the PCB is wired to a visual signal display adjacent the fiber optic and electrical connector 10, signalling the connectivity of the patch. For example, lights may indicate connectivity via a green light or disconnectivity via a red light. The data signal line 40 may also signal a remote management center via the PCB displaying the serial number of the SOT 34 of the fiber optic and electrical connector 10. In a preferred embodiment, this serial number may be identified with a particular distributed destination. For example, in a long distance telephone network, the serial number may be associated with a particular intra-city route in a network.

Figure 2:
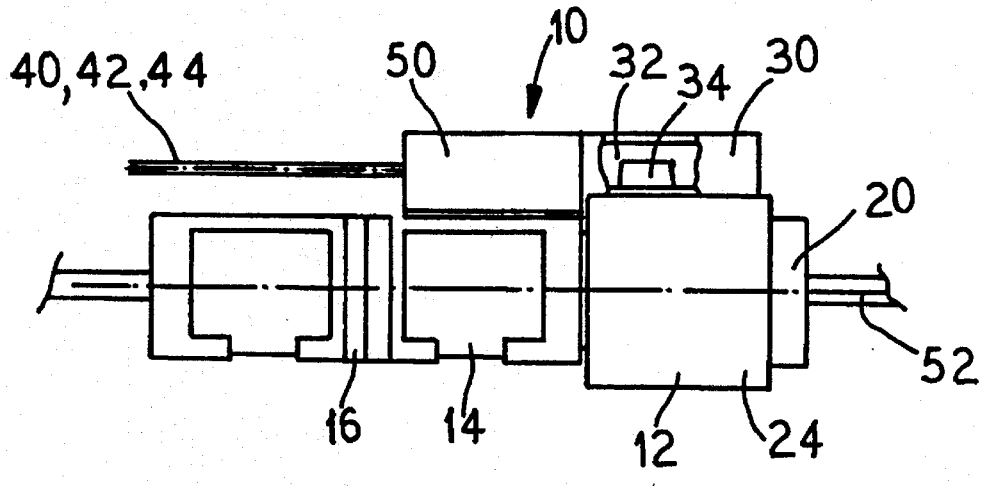
FIG. 2 is a side elevation of the fiber optic and electrical connector of FIG. 1.

FIG. 2 shows a side elevation view of FIG. 1. The fiber optic and electrical connector 10 is shown having a first fiber optic connector 12, having duplex collar 24 holding a pair of simplex SC fiber optic connectors 20. Mounted to the duplex housing 24 is first electrical connector 32 and SOT 34. The first fiber optic connector plug 12 is inserted into second fiber optic connector 14. Mounted to the second fiber optic connector 14 is second electrical connector 50. The second fiber optic connector 14 is mounted on patch panel 16. In a preferred embodiment, the second electrical connector 50 includes male contact members which are received by the first electrical connector 32 which include female receptacle pins 41,43,45. Data lines 40,42,44 exit the second electrical connector 50. It is important to note that while there is a fiber optic cable 52 which exits the first fiber optic connector 12, there is no line out of the first electrical connector 32. As the power source for the SOT 34 is derived from the data line 44 only, no external power source for the first electrical connector 32 is required.

Figure 3:
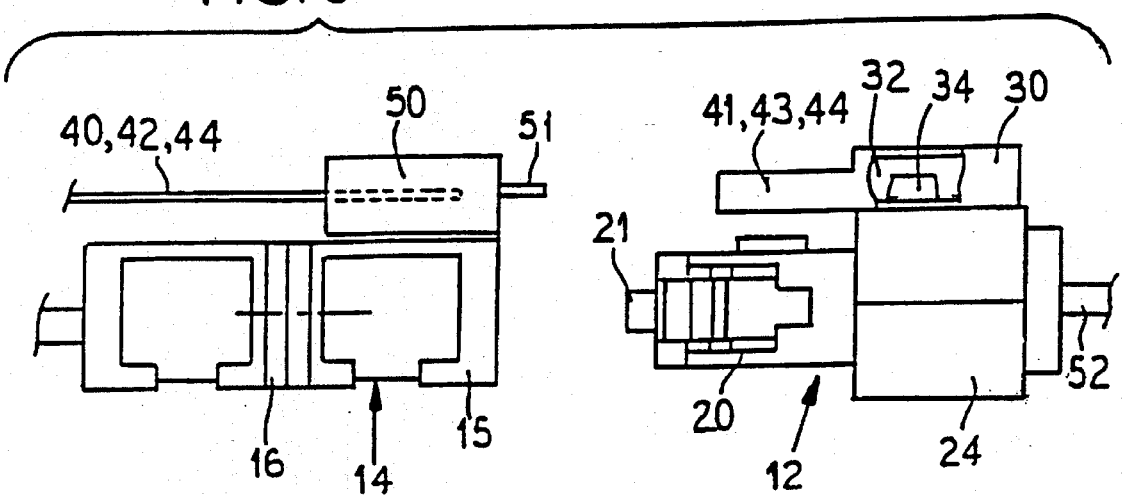
FIG. 3 is a side elevation view of the fiber optic and electrical connector disconnected.

Turning to FIG. 3, the first fiber optic connector 12 is shown disconnected from the second fiber optic connector 14. The first fiber optic connector 12 includes a housing 24 which holds a pair of SC simplex connectors 20, including ferrule 21. Mounted to the housing 24 is first electrical connector 32 and SOT 34. Protruding from the first electrical connector 32 are receptacle contacts 41,43,44. Mounted to a patch panel 16 is second fiber optic connector 14. In a preferred embodiment, the fiber optic connector is a receptacle 15. Mounted to the second fiber optic connector 14 is second electrical connector 50 which includes male contact members 51. In its unmated state, there is no power return from the data lines 40,42,44 and therefore, the data management system signals that there is no connectivity. Upon mating of the first fiber optic connector 12 with the second fiber optic connector 14, the first electrical connector 32 simultaneously mates with the second electrical connector 50. Power is then transmitted through the data lines 40 into the SOT 34 of the first electrical connector 32 and a return signal on data line 42 is received at the PCB.

Figure 4:
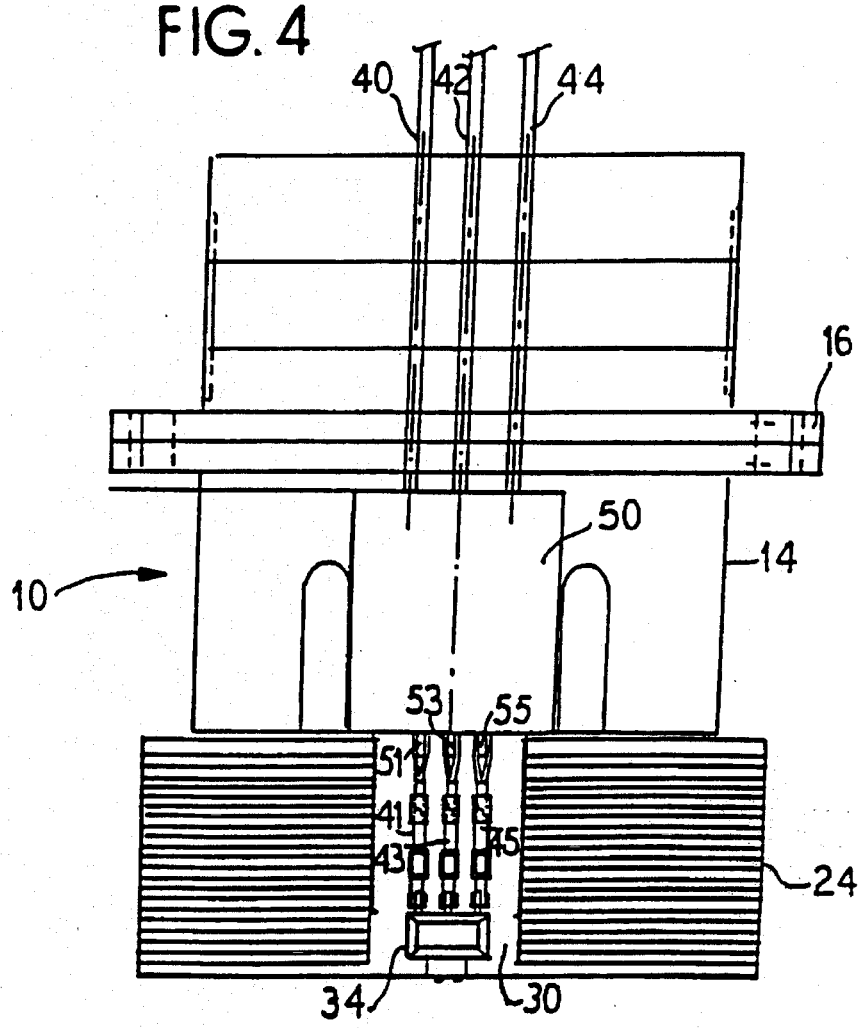
FIG. 4 is an enlarged view of the fiber optic and electrical connector of FIG. 1.

FIG. 4 is an enlarged top view of the fiber optic and electrical connector 10 as shown in FIG. 1. The duplex housing 24 has mounted thereon first electrical connector 32. The first electrical connector 32 has been cut away to show the contacts 41,43,45 of the first electrical connector 32. It can be seen that the contacts 41,43,45 of the first electrical connector 32 are connected to the SOT 34. The contacts 41,43,45 of the first electrical connector 32 receive male contacts 51,53,55 of the second electrical connector 50 which is mounted to the second fiber optic connector 14. The second fiber optic connector 14 is mounted to the patch panel 16. The male pins 51,53,55 of the second electrical connector 50 are connected to the data lines 40,42,44, respectively. These data lines 40,42,44 are connected to a control board or PCB.

It should be understood that various changes and modifications to the presently preferred embodiments described herein will be apparent to those skilled in the art. Such changes and modifications may be made without departing from the spirit and scope of the present invention and without diminishing its attendant advantages. For example, the first electrical connector 32 and the second fiber optic connector 14 in the preferred embodiments are plugs including male contacts or ferrules. However any combination of plugs and receptacles are anticipated by this invention. It is, therefore, intended that such changes and modifications be covered by the appended claims.

What is claimed is:

1. A fiber optic and electrical connector for facilitating remote system management and connectivity verification comprising:

a first fiber optic connector, including a housing;

a first electrical connector attached to said housing, said first electrical connector including a transistor and providing for data identification transmission;

said first fiber optic connector mating to a second fiber optic connector; and said first electrical connector simultaneously mating to a second electrical connector.

2. The fiber optic and electrical connector of claim 1 wherein said first electrical connector receives power from a data line of said second electrical connector.

3. The fiber optic and electrical connector of claim 1 wherein said first fiber optic connector includes a duplex push/pull style connector.

4. The fiber optic and electrical connector of claim 1 wherein said first electrical connector includes pin and socket connector.

5. The fiber optic and electrical connector of claim 1 wherein said first electrical connector includes a unique electronically accessible identifier.

6. The fiber optic and electrical connector of claim 1 wherein said second electrical connector includes data lines connected to a control board.

7. The fiber optic and electrical connector of claim 1 wherein said first electrical connector includes a SOT.

8. The fiber optic and electrical connector of claim 1 wherein said first electrical connector receives power solely from the data line side.

9. A fiber optic and electrical connector for facilitating remote system management or connectivity verification comprising:

a first fiber optic connector, including a housing;

a first electrical connector attached to said housing, providing for data identification transmission and including a unique electronically accessible identifier;

said first fiber optic connector mating to a second fiber optic connector; and said first electrical connector simultaneously mating to a second electrical connector.

10. A fiber optic and electrical connector for facilitating remote system management and connectivity verification comprising:

a first fiber optic connector, including a housing;

a first electrical connector attached to said housing, providing for data identification transmission;

said first fiber optic connector mating to a second fiber optic connector; and said first electrical connector simultaneously mating to a second electrical connector wherein a one-to-one relationship between said first fiber optic connector and said second fiber optic connector and between said first electrical connector and said second electrical connector is provided.

11. The fiber optic and electrical connector of claim 10 wherein said first electrical connector receives power from a data line of said second electrical connector.

12. The fiber optic and electrical connector of claim 10 wherein said first fiber optic connector includes a duplex push/pull style connector.

13. The fiber optic and electrical connector of claim 10 wherein said first electrical connector includes pin and socket connector.

14. The fiber optic and electrical connector of claim 10 wherein said first electrical connector includes a unique electronically accessible identifier.

15. The fiber optic and electrical connector of claim 10 wherein said second electrical connector includes data lines connected to a control board.

16. The fiber optic and electrical connector of claim 10 wherein said control board is attached to a remote connectivity management system.

17. The fiber optic and electrical connector of claim 10 wherein said first electrical connector includes a SOT.

18. The fiber optic and electrical connector of claim 10 wherein said first electrical connector receives power solely from the data line side.

* * * * *